United States Patent
Reichenbach-Klinke et al.

(10) Patent No.: US 9,051,503 B2
(45) Date of Patent: *Jun. 9, 2015

(54) USE OF HYDROPHOBICALLY ASSOCIATED COPOLYMER AS AN ADDITIVE IN SPECIFIC OILFIELD APPLICATIONS

(75) Inventors: Roland Reichenbach-Klinke, Traunstein (DE); Oscar Lafuente Cerda, Ebersberg (DE); Andrea Assmann, Unterreit (DE); Björn Langlotz, Trostberg (DE)

(73) Assignee: BASF SE, Ludwigshafen (DE)

( * ) Notice: Subject to any disclaimer, the term of this patent is extended or adjusted under 35 U.S.C. 154(b) by 555 days.

This patent is subject to a terminal disclaimer.

(21) Appl. No.: 13/292,264

(22) Filed: Nov. 9, 2011

(65) Prior Publication Data

US 2012/0129734 A1    May 24, 2012

Related U.S. Application Data

(60) Provisional application No. 61/416,758, filed on Nov. 24, 2010.

(51) Int. Cl.
| | | |
|---|---|---|
| *C09K 8/68* | (2006.01) | |
| *C09K 8/12* | (2006.01) | |
| *C09K 8/38* | (2006.01) | |
| *C09K 8/40* | (2006.01) | |
| *C09K 8/70* | (2006.01) | |
| *C09K 8/88* | (2006.01) | |
| *C09K 8/92* | (2006.01) | |

(52) U.S. Cl.
CPC ... *C09K 8/12* (2013.01); *C09K 8/38* (2013.01); *C09K 8/40* (2013.01); *C09K 8/68* (2013.01); *C09K 8/703* (2013.01); *C09K 8/88* (2013.01); *C09K 8/92* (2013.01)

(58) Field of Classification Search
CPC ....... E21B 47/122; E21B 47/00; E21B 47/14; E21B 21/00; E21B 33/13; E21B 3/02; E21B 41/0085; E21B 43/255; E21B 43/28; E21B 44/02; E21B 47/0002; E21B 47/12; E21B 49/008; E21B 49/084; E21B 10/55; E21B 10/567; E21B 10/322; E21B 10/5673; E21B 10/573; E21B 15/00; E21B 19/06; E21B 21/001; E21B 33/12; E21B 43/08; E21B 44/00; E21B 10/52; E21B 17/08; C09K 8/035; C09K 8/58; C09K 3/30; C09K 5/045; C09K 8/80; C09K 2205/22; C09K 2205/40; C09K 2208/00; C09K 2208/34; C09K 3/00; C09K 8/032; C09K 8/38; C09K 8/524; C09K 8/56; C09K 8/68

See application file for complete search history.

(56) References Cited

U.S. PATENT DOCUMENTS

| | | | | |
|---|---|---|---|---|
| 4,384,096 | A | | 5/1983 | Sonnabend |
| 4,421,902 | A | * | 12/1983 | Chang et al. ............... 424/49 |
| 4,792,593 | A | | 12/1988 | Schulz et al. |
| 4,892,916 | A | * | 1/1990 | Hawe et al. ............... 526/304 |
| 4,921,902 | A | * | 5/1990 | Evani et al. ............... 524/555 |
| 5,086,142 | A | * | 2/1992 | Fock et al. ............... 526/318 |
| 5,089,578 | A | | 2/1992 | Valint et al. |
| 8,362,180 | B2 | * | 1/2013 | Reichenbach-Klinke et al. ......... 526/333 |
| 8,752,624 | B2 | * | 6/2014 | Reichenbach-Klinke et al. ......... 166/270.1 |
| 8,763,698 | B2 | * | 7/2014 | Reichenbach-Klinke et al. ......... 166/275 |
| 2010/0331510 | A1 | * | 12/2010 | Reichenbach-Klinke et al. ......... 526/274 |

FOREIGN PATENT DOCUMENTS

| | | |
|---|---|---|
| DE | 100 37 629 A1 | 2/2002 |
| DE | 10 2004 032 304 A1 | 2/2006 |
| EP | 0 705 854 A1 | 4/1996 |
| WO | WO 85/03510 | 8/1985 |
| WO | WO 2006/002936 A1 | 1/2006 |
| WO | WO 2010/133527 A2 | 11/2010 |
| WO | WO 2011/015520 A1 | 2/2011 |

OTHER PUBLICATIONS

Hill, et al. "Properties of Hydrophobically Associating Polyacrylamides: Influence of the Method of Synthesis", Macromolecules, 26 (1993), pp. 4521-4532.

Taylor, et al. "Water-soluble hydrophobically associating polymers for improved oil recovery: A literature review", Journal of Petroleum Science and Engineering, 19 (1998), pp. 265-280.

* cited by examiner

*Primary Examiner* — Susannah Chung
*Assistant Examiner* — Kumar R Bhushan
(74) *Attorney, Agent, or Firm* — Norton Rose Fulbright US LLP

(57) ABSTRACT

What is proposed is the use of a water-soluble hydrophobically associating copolymer as an additive in the development, exploitation and completion of underground mineral oil and natural gas deposits and in deep drillings, wherein the copolymer comprises (a) at least one monoethylenically unsaturated monomer (a) selected from

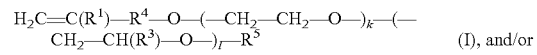 (I), and/or

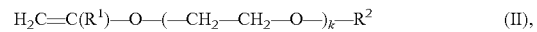 (II), and (b) at least one monoethylenically unsaturated, hydrophilic monomer (b) different from monomer (a),
wherein the copolymer is obtainable through copolymerization of the monomers (a) and (b) in the presence of at least one surfactant (c).

17 Claims, 4 Drawing Sheets

Figure 1:
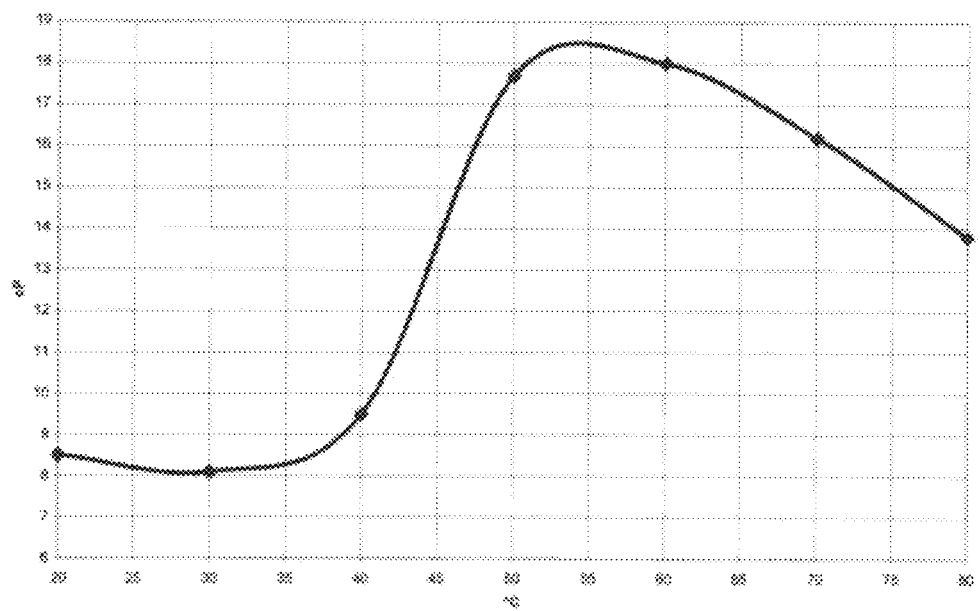

USE OF HYDROPHOBICALLY ASSOCIATED COPOLYMER AS AN ADDITIVE IN SPECIFIC OILFIELD APPLICATIONS

This application claims the benefit of U.S. provisional application No. 61/416,758 filed Nov. 24, 2010, incorporated herein by reference in its entirety.

The present invention relates to the use of a water-soluble hydrophobically associating copolymer as an additive in the development, exploitation and completion of underground mineral oil and natural gas deposits and in deep drillings.

A copolymer of the above mentioned type is described in WO 2011/015520 A1 with priority of Aug. 6, 2009, published on Feb. 10, 2011. That international patent application concerns a water-soluble, hydrophobically associating copolymer which is obtained in the presence of an non-polymerizable tenside, and processes for the preparation thereof and uses thereof. However, the specific applications and uses as described and claimed in this present patent application have not been recognized and described in that prior international patent application.

Water-soluble thickening polymers are used in many fields of industry, for example in the field of cosmetics, in foods, for production of detergents, printing inks and emulsion paints, but especially in mineral oil production.

There are many known chemically different classes of polymers which can be used as thickeners. An important class of thickening polymers is that of what are called "hydrophobically associating polymers". These are water-soluble polymers which have lateral or terminal hydrophobic groups, for example relatively long alkyl chains. In aqueous solution, such hydrophobic groups can associate with each other or with other substances having hydrophobic groups. This forms an associative network by which the medium is thickened.

According to Taylor, K. C. and Nasr-El-Din, H. A., "Hydrophobically Associating Polymers for Oilfield Applications", presented at the Canadian International Petroleum Conference, Calgary, AB, Canada, Jun. 12-14, 2007, p. 1, " . . . hydrophobically associating polymers (AP) are water-soluble polymers that contain a small number (less than one mole percent) of hydrophobic groups attached directly to the polymer backbone . . . ". This definition shall be adhered to for the purpose of the present patent application, keeping in mind, however, that one mole percent can be as much as ten or even twenty percent by weight of that hydrophobic groups.

An important area of use of these hydrophobically associating polymers is in the field of mineral oil production, especially of tertiary mineral oil production (enhanced oil recovery, EOR). Details of the use of hydrophobically associating copolymers for tertiary mineral oil production are described, for example, in the review article by Taylor, K. C. and Nasr-El-Din, H. A. in J. Petr. Sci. Eng. 1998, 19, 265-280.

Another of the techniques of tertiary mineral oil production is known as "polymer flooding". A mineral oil deposit is not an underground "lake of mineral oil", but rather the mineral oil is held in tiny pores of the mineral oil-bearing rock. The diameter of the pores in the formation is typically only a few micrometers. For polymer flooding, an aqueous solution of a thickening polymer is injected through injection boreholes into a mineral oil deposit. The injection of the polymer solution forces the mineral oil through said cavities in the formation from the injection borehole proceeding in the direction of the production borehole, and the mineral oil is produced via the production borehole.

The use of an aqueous polymer solution as opposed to pure water prevents channels of different permeability from forming in the course of flooding of the underground formation (known as "fingering"), as a result of which the other underground regions would not be flooded. The addition of the polymer to the aqueous phase reduces the mobility thereof and leads as a result to a more homogeneous flooding operation.

A further technique in mineral oil production is known as "hydraulic fracturing". In hydraulic fracturing, for example, a high-viscosity aqueous solution is injected under high pressure into the oil- or gas-bearing formation layer. The high pressure gives rise to cracks in the rock, which facilitates the production of oil or gas. The thickeners used here are in particular guar and the more thermally stable derivatives thereof, for example hydroxypropylguar or carboxymethyl-hydroxypropylguar (J. K. Fink, Oil Field Chemicals, Elsevier 2003, p. 240 ff). These biopolymers, however, like most polymers in general, have a distinct decrease in viscosity with rising temperature. Since, however, elevated temperatures exist in the underground formations, it would be advantageous for use in hydraulic fracturing to use thickeners whose viscosity does not decrease or actually even rises with rising temperature.

Further areas of use of hydrophobically associating copolymers in the field of mineral oil production are the thickening of drilling muds and completion fluids. For example, Ezell et al. (presentation AADE-10-DF-HO-01 at the AADE Fluids Conference and Exhibition, Houston, Tex., USA, 6-7 Apr. 2010) describe the use of associative thickeners in completion fluids. In addition, Taylor describes, in his review article (Ann. Transactions of the Nordic Rheology Society, Vol. 11, 2003), the use of hydrophobically associating polymers in drilling muds and completion fluids. It is stated that the viscosity of these copolymers decreases with rising temperature.

Foamed fluids are used in hydraulic fracturing, both as "proppants" and as "diverting agents" (Burman et al., 1986, DOI: 10.2118/15575-MS; Parlar et al., 1995, DOI: 10.2118/29678-MS). The foam is said to remain stable over the entire treatment. Different factors influence the stability of the foam, including the viscosity, the chemical composition of the foam formers, the formation temperature and the gas phase.

It should also be ensured that the aqueous polymer solution contains no gel particles at all. This is because even small gel particles with dimensions in the micrometer range can block the fine pores in the formation and hence stop the mineral oil production. Hydrophobically associating copolymers for mineral oil production should therefore have a minimum proportion of gel particles. The aim is for the polymers to achieve an increase in the viscosity of the water, which ideally corresponds to the viscosity of the hydrocarbons to be produced.

Hydrophobically associating water-soluble copolymers are frequently prepared by what is known as micellar copolymerization. This involves solvating water-insoluble comonomers by the addition of surfactants in the aqueous reaction medium and reacting them with hydrophilic comonomers, for example acrylamide, to give a water-soluble hydrophobically associating copolymer. For example, Macromol. Chem. Phys. 2001, 202, 1384-1397 describes the micellar copolymerization of the water-soluble comonomers acrylamide, AMPS® (acrylamidomethylpropanesulphonic acid) and MADQUAT ([2-(methacryloyloxy)ethyl]trimethylammonium chloride) with dihexylacrylamide or N-(4-ethylphenyl)acrylamide, while Polymer 1998, 39 (5), 1025-1033 discusses the copolymerization of acrylamide with dihexylacrylamide, and Eur. Polym. J. 2007, 43, 824-834 the copolymerization of acrylamide with N-octadecylacrylamide. The surfactant used in both cases is sodium dodecylsulphonate (SDS). A further example of a micellar copolymerization is given by J. Colloid Interf. Sci, 2009, 333, 152-163. Acrylamide is reacted here with a polypropylene glycol methacrylate in the presence of SDS.

In addition, WO 85/03510 describes water-soluble hydrophobically associating copolymers of an ethylenically unsaturated water-soluble monomer and of an ethylenically unsaturated amphiphilic monomer with hydrophobic groups. These copolymers are obtained by reaction of water-soluble monomers, for example acrylamide, and amphiphilic monomers, for example dodecylpolyoxyethylene (10) methacrylate. The amphiphilic comonomers are characterized as water-soluble at room temperature but water-insoluble at elevated temperature or the temperature used in the preparation of the copolymers, for example of 60° C. Therefore, a surfactant or emulsifier is added here too if required, i.e. when the polymerization is effected at elevated temperature, in order to ensure the solubility of the amphiphilic comonomer under the polymerization conditions. However, the monomer is then no longer a water-soluble variant.

A further method for preparation of water-soluble hydrophobically associating copolymers is the use of surface-active water-soluble comonomers. These comonomers have a hydrophobic component which brings about the hydrophobically associating effect in the copolymer, and a hydrophilic component which ensures the water solubility of the comonomer. The advantage of this process is that no additional surfactant is needed for solvation of the hydrophobically associating monomer.

Examples of the use of this process can be found in EP 705 854 A1, DE 100 37 629 A1 and DE 10 2004 032 304 A1. These documents disclose water-soluble hydrophobically associating copolymers and use thereof, for example in the construction chemistry sector. The hydrophobically associating monomers present in the copolymers disclosed are in each case monomers of the following type: $H_2C=C(R^x)—COO—(—CH_2—CH_2—O—)_q—R^y$ or else $H_2C=C(R^x)—O—(—CH_2—CH_2—O—)_q—R^y$, where $R^x$ is typically H or $CH_3$ and $R^y$ is a larger hydrocarbyl radical, typically hydrocarbyl radicals having 8 to 40 carbon atoms. Examples specified in the documents are relatively long alkyl groups, or else a tristyrylphenyl group.

In addition, J. Appl. Polym. Sci. 1999, 74, 211-217 discusses the use of a cationic water-soluble hydrophobically associating comonomer which has been obtained by reacting 2-methacryloyloxyethyldimethylamine with 1-bromododecane.

Canadian patent 2,196,908 is concerned with associating monomers and polymers. At the forefront of this document are essentially emulsion polymers of methacrylic acid, ethyl acrylate and a monomer which has been obtained by reaction of dimethyl-m-isoprenylbenzyl isocyanate (DMI) and EIM or polybutylene oxide or polybutylene oxide-co-polyethylene oxide. This is done using in particular water-insoluble and nonhydrophilic monomers, for example ethyl acrylate.

It can be stated in general terms that the known hydrophobically associating copolymers when used as thickeners in the field of mineral oil production have the disadvantage that the viscosity decreases with rising temperature. Since the use of these polymers in mineral oil production usually takes place at elevated temperature, this is a particularly serious disadvantage.

A further disadvantage of the above-described and commercially available hydrophobically associative polymers is the high gel content thereof, which forms in the course of dissolution and can block porous formations. This problem has already been partly solved with copolymers according to our prior international patent application WO 2010/133527 A2 with priority of May 20, 2009, published Nov. 25, 2010. The gel contents were reduced markedly therein, but not avoided entirely. There was still a need for hydrophobically associative polymers with improved properties compared to the already known hydrophobically associating copolymers. Our above mentioned prior international patent application WO 2011/015520 A1 provides a hydrophobically associating copolymer with low or undetectable gel content.

The object of this present invention was to examine whether this copolymer is suitable for use as an additive in the development, exploitation and completion of underground mineral oil and natural gas deposits and in deep drillings, for example in hydraulic fracturing, as a thickener or stabilizer of foams, and as a thickener of completion fluids, spacer fluids and drilling muds under the conditions customary in underground formations. This object is achieved by the features of the independent claim. The dependent claims relate to preferred embodiments.

It has been found that, surprisingly, the copolymer described in our above mentioned prior international patent application WO 2011/015520 A1 has an advantageous viscosity profile and is particularly suitable, for example, as a thickener for completion fluids, spacer fluids and drilling muds, hydraulic fracturing and foams, since the viscosity of this copolymer increases with rising temperature up to a maximum at approx. 60° C.

The present invention thus provides for the use of a hydrophobically associating copolymer as an additive in the development, exploitation and completion of underground mineral oil and natural gas deposits and in deep drillings, wherein the copolymer comprises (a) at least one monoethylenically unsaturated monomer (a) selected from

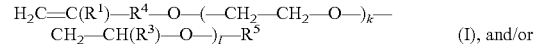

(I), and/or

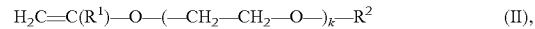

(II), where the $—(—CH_2—CH_2—O—)_k—$ and $—(—CH_2—CH(R^3)—O—)_l—$ units are arranged in block structure in the sequence shown in formula (I) and the radicals and indices are each defined as follows:

k: a number from 6 to 150,
l: a number from 5 to 25,
R1: H or methyl,
R2: an aliphatic and/or aromatic, straight-chain or branched hydrocarbyl radical having 8 to 40 carbon atoms,
R3: each independently a hydrocarbyl radical having at least 2 carbon atoms,
R4: a single bond or a divalent linking group selected from the group of $—(C_nH_{2n})—[R^{4a}]$, $—O—(C_{n'}H_{2n'})—[R^{4b}]$ and $—C(O)—O—(C_{n''}H_{2n''})—[R^{4c}]$, where n, n' and n" are each integers from 1 to 6,
R5: H or a $C_{1-30}$-hydrocarbyl radical, preferably H or a $C_{1-5}$-alkyl radical and particularly H, and (b) at least one monoethylenically unsaturated, hydrophilic monomer (b) different from monomer (a), wherein the copolymer is obtainable through copolymerization of the monomers (a) and (b) in the presence of at least one surfactant (c).

The synthesis of the copolymer as used according to the invention, before the initiation of the polymerization reaction, advantageously involved the presence of said at least one surfactant (c), which is a nonpolymerizable surfactant. The term "nonpolymerizable surfactant" as used herein has been chosen for clarity reasons. Surfactants, as a rule, are nonpolymerizable compounds. By using this term, it is meant to clarify that the surfactant (c) will not become chemically bound to, in or by the copolymer of the invention.

As already mentioned above, one advantage of the processes known from the prior art is considered to be that the hydrophobically associating copolymers can be prepared without the addition of a surfactant, since all comonomers used therein are water-soluble. It was therefore all the more surprising that, in the copolymer according to WO 2011/015520 A1 the addition of a surfactant during the aqueous solution polymerization of hydrophilic monomers with a water-soluble hydrophobically associating comonomer achieved a distinct improvement in the polymer properties, especially the thickening action, and also significantly reduced the gel content. Without wanting to be bound by theory, this effect can probably be explained as follows:

In the known procedure, the hydrophobically associating comonomer forms micels in the aqueous reaction medium. In the polymerization, the effect of this is that the hydrophobically associating regions are incorporated blockwise into the polymer. If an additional nonpolymerizable surfactant is present in the course of preparation of the copolymer, preferably already before the initiation of the polymerization reaction, mixed micelles form. These mixed micelles thus contain polymerizable comonomer and nonpolymerizable sufractant. As a result, the hydrophobically associating monomers are then incorporated in shorter blocks. At the same time, the number of these shorter blocks per polymer chain is greater. Thus, the polymer constitution of the copolymer according to WO 2011/015520 A1 differs distinctly from the prior art copolymers, as a result of which the performance properties thereof also improve significantly.

The inventive hydrophobically associating copolymers are water-soluble copolymers which contain a small number of hydrophobic groups. In aqueous solution, the hydrophobic groups can associate with themselves or with other substances having hydrophobic groups, and thicken the aqueous medium by virtue of this interaction.

The person skilled in the art is aware that the solubility of hydrophobically associating (co)polymers in water may be dependent to a greater or lesser degree on the pH according to the type of monomers used. The reference point for the assessment of water solubility should therefore in each case be the pH desired for the particular end use of the copolymer. A copolymer which has insufficient solubility for the intended end use at a particular pH may have a sufficient solubility at a different pH. The term "water-soluble" especially also includes alkali-soluble dispersions of polymers, i.e. polymers which are present as dispersions in the acidic pH range and only in the alkaline pH range dissolve in water and display their thickening action.

In the ideal case, the copolymers of the invention should be miscible with water in any ratio. According to the invention, however, it is sufficient when the copolymers are water-soluble at least at the desired use concentration and at the desired pH. In general, the solubility in distilled water at room temperature (20° C.) should be at least 20 g/l, preferably at least 50 g/l and more preferably at least 100 g/l.

The inventive hydrophobically associating copolymers therefore comprise, in addition to the hydrophobic groups already mentioned, hydrophilic groups in such an amount that the water solubility outlined is ensured at least in the pH range envisaged for the particular use.

Monomer (a)

The inventive hydrophobically associating copolymer comprises at least one monoethylenically unsaturated monomer (a) which imparts hydrophobically associating properties to the copolymer of the invention and is therefore referred to hereinafter as "hydrophobically associating monomer". According to the invention, the at least one monoethylenically unsaturated water-soluble monomer (a) is at least one compound of the general formulas (I) and/or (II) as defined hereinabove.

In the monomers (a) of the formula (I), an ethylenic group $H_2C=C(R^1)-$ is thus bonded via a divalent linking $-R^4-O-$ group to a polyoxyalkylene radical with block structure, i.e. $-(-CH_2-CH_2-O-)_k-(-CH_2-CH(R^3)-O-)_l-H$, where the two $-(-CH_2-CH_2-O-)_k-$ and $-(-CH_2-CH(R^3)-O-)_l-$ blocks are arranged in the sequence shown in formula (I). The polyoxyalkylene radical may thus have a terminal OH group.

In the abovementioned formula, $R^1$ is H or a methyl group. $R^4$ is a single bond or a divalent linking group selected from the group of $-(C_nH_{2n})-[R^{4a}]$, $-O-(C_{n'}H_{2n'})-[R^{4b}]$ and $-C(O)-O-(C_{n''}H_{2n''})-[R^{4c}]$. In the formulae mentioned, n, n' and n'' are each natural numbers from 1 to 6. In other words, the linking group comprises straight-chain or branched aliphatic hydrocarbyl groups having 1 to 6 carbon atoms, which are joined to the ethylenic group $H_2C=C(R^1)-$ directly, via an ether group $-O-$ or via an ester group $-C(O)-O-$. The $-(C_nH_{2n})-$, $-(C_{n'}H_{2n'})-$ and $-(C_{n''}H_{2n''})-$ groups are preferably linear aliphatic hydrocarbyl groups.

$R^{4a}$ is preferably a group selected from $-CH_2-$, $-CH_2-CH_2-$ and $-CH_2-CH_2-CH_2-$, more preferably a methylene group $-CH_2-$.

$R^{4b}$ is preferably a group selected from $-O-CH_2-CH_2-$, $-O-CH_2-CH_2-CH_2$ and $-O-CH_2-CH_2-CH_2-CH_2-$, more preferably $-O-CH_2-CH_2-CH_2-CH_2-$.

$R^{4c}$ is preferably a group selected from $-C(O)-O-CH_2-CH_2-$, $-C(O)O-CH(CH_3)-CH_2-$, $-C(O)O-CH_2-CH(CH_3)-$, $-C(O)O-CH_2-CH_2-CH_2-CH_2-$ and $-C(O)O-CH_2-CH_2-CH_2-CH_2-CH_2-CH_2-$, more preferably $-C(O)-O-CH_2-CH_2-$ and $-C(O)O-CH_2-CH_2-CH_2-CH_2-$ and most preferably $-C(O)-O-CH_2-CH_2-$.

The $R^4$ group is more preferably an $R^{4a}$ or $R^{4b}$ group, more preferably an $R^{4b}$ group.

In addition, $R^4$ is more preferably a group selected from $-CH_2-$ and $-O-CH_2-CH_2-CH_2-CH_2-$, most preferably $-O-CH_2-CH_2-CH_2-CH_2-$.

The monomers of the formula (I) also have a polyoxyalkylene radical which consists of the units $-(-CH_2-CH_2-O-)_k-$ and $-(-CH_2-CH(R^3)-O-)_l-$ where the units are arranged in block structure in the sequence shown in formula (I). The transition between the two blocks may be abrupt or else continuous.

The number of alkylene oxide units k is a number from 6 to 150, preferably 12 to 100, more preferably 15 to 80, even more preferably 20 to 30 and, for example, approx. 22 to 25. It is clear to the person skilled in the art in the field of the polyalkylene oxides that the numbers mentioned are averages of distributions.

In the second, terminal $-(-CH_2-CH(R^3)-O-)_l-$ block, the $R^3$ radicals are each independently hydrocarbyl radicals of at least 2 carbon atoms, preferably at least 3 and more preferably 3 to 10 carbon atoms. This may be an aliphatic and/or aromatic, linear or branched carbon radical. It is preferably an aliphatic radical.

Examples of suitable $R^3$ radicals comprise ethyl, n-propyl, n-butyl, n-pentyl, n-hexyl, n-heptyl, n-octyl, n-nonyl or n-decyl, and phenyl. Examples of preferred radicals comprise n-propyl, n-butyl, n-pentyl, particular preference being given to an n-propyl radical.

The —(—$CH_2$—$CH(R^3)$—O—)$_l$— block is thus a block which consists of alkylene oxide units having at least 4 carbon atoms, preferably at least 5 carbon atoms, and/or glycidyl ethers having an ether group of at least 2, preferably at least 3, carbon atoms. Preferred $R^3$ radicals are the hydrocarbyl radicals mentioned; the units of the second terminal block are more preferably alkylene oxide units comprising at least 5 carbon atoms, such as pentene oxide units or units of higher alkylene oxides.

The number of alkylene oxide units I is a number from 5 to 25, preferably 6 to 20, more preferably 8 to 18, even more preferably 10 to 15 and, for example, approx. 12.

In the monomers of the formula (I), a monoethylenic group is joined to a polyoxyalkylene group with block structure, specifically firstly to a hydrophilic block having polyethylene oxide units, which is in turn joined to a second terminal hydrophobic block formed at least from butene oxide units, preferably at least pentene oxide units, or units of higher alkylene oxides, for example dodecene oxide. The second block has a terminal OH group. In contrast to the hydrophobically associating monomers (a) of the formula (II) and/or (III), the end group is thus not etherified with a hydrocarbyl radical for the hydrophobic association, but rather the terminal —(—$CH_2$—$CH(R^3)$—O—)$_l$— block with the $R^3$ radicals is itself responsible for the hydrophobic association of the copolymers prepared using the monomers (a) of the formula (I).

The $R^5$ radical is H or a preferably aliphatic hydrocarbyl radical having 1 to 30 carbon atoms, preferably 1 to 10 and more preferably 1 to 5 carbon atoms. $R^5$ is preferably H, methyl or ethyl, more preferably H or methyl and most preferably H.

The monomers (a) of the formula (II) are preferably compounds of the general formula $H_2C$=CH—O—(—$CH_2$—$CH_2$—O—)$_k$—$R^2$ where k is a number from 10 to 40 and $R^2$ is a tristyrylphenyl radical.

The monomer representatives (I) and (II) may be involved in any proportions in the structure of the copolymer.

It is clear to the person skilled in the art in the field of polyalkylene oxide block copolymers that the transition between the two blocks, according to the method of preparation, may be abrupt or else continuous. In the case of a continuous transition, there is still a transition zone between the two blocks, which comprises monomers of both blocks. When the block boundary is fixed at the middle of the transition zone, it is possible for the first block —(—$CH_2$—$CH_2O$—)$_k$— to have small amounts of —$CH_2$—$CH(R^3)$—O— units and for the second block —(—$CH_2$—$CH(R^3)$—O—)$_l$— to have small amounts of —$CH_2$—$CH_2$—O— units, although these units are not arranged randomly over the block but are arranged in the transition zone mentioned.

According to the invention, the monomers (a) are water-soluble. In general, the solubility of the monomers (a) in distilled water at room temperature (20° C.) should be at least 10 g/l, preferably at least 50 g/l and more preferably at least 100 g/l.

The amount of the monoethylenically unsaturated, hydrophobically associating monomers (a) is guided by the particular end use of the inventive copolymer and is generally 0.1 to 20% by weight based on the total amount of all monomers in the copolymer. The amount is preferably 0.5 to 15% by weight.

Hydrophilic Monomers (b)

Over and above the monomers (a), the inventive hydrophobically associating copolymer comprises at least one different monoethylenically unsaturated hydrophilic monomer (b). It is of course also possible to use mixtures of a plurality of different hydrophilic monomers (b).

The hydrophilic monomers (b) comprise, in addition to an ethylenically unsaturated group, one or more hydrophilic groups. The hydrophilic groups are especially functional groups which comprise oxygen and/or nitrogen atoms. They may additionally comprise especially sulphur and/or phosphorus atoms as heteroatoms.

In the ideal case, the monomers (b) should be miscible with water in any ratio, but it is sufficient for execution of the invention that the hydrophobically associating copolymer of the invention has the water solubility mentioned at the outset. In general, the term "hydrophilic" in connection with monomer (b) means that the solubility of monomer (b) in distilled water at room temperature (20° C.) should be at least 100 g/l, preferably at least 200 g/l and more preferably at least 500 g/l.

Examples of suitable functional groups include carbonyl groups >C=O, ether groups —O—, especially polyethylene oxide groups —($CH_2$—$CH_2$—O—)$_n$— where n is preferably a number from 1 to 200, hydroxyl groups —OH, ester groups —C(O)O—, primary, secondary or tertiary amino groups, ammonium groups, amide groups —C(O)—NH—, carboxamide groups —C(O)—$NH_2$, or acidic groups such as carboxyl groups —COOH, sulpho groups —$SO_3H$, phosphonic acid groups —$PO_3H_2$ or phosphoric acid groups —OP(OH)$_3$.

Examples of preferred functional groups include hydroxyl groups —OH, carboxyl groups —COOH, sulpho groups —$SO_3H$, carboxamide groups —C(O)—$NH_2$, amide groups —C(O)—NH— and polyethylene oxide groups —($CH_2$—$CH_2$—O—)$_n$—H where n is preferably a number from 1 to 200.

The functional groups may be attached directly to the ethylenically unsaturated group, or else joined to the ethylenically unsaturated group via one or more linking hydrocarbyl groups.

The at least one hydrophilic monomer (b) is preferably a monomer comprising acidic groups, where the acidic groups, in accordance with the invention, comprise at least one group selected from the group of —COOH, —$SO_3H$ and —$PO_3H_2$. Preference is also given to monomers of the general formula $H_2C$=C($R^7$)$R^8$ where $R^7$ is H or methyl and $R^8$ is a hydrophilic group or a group comprising one or more hydrophilic groups.

The $R^8$ groups are groups which comprise heteroatoms in such an amount that the water solubility defined at the outset is attained.

Examples of suitable monomers (b) include monomers comprising acidic groups, for example monomers comprising —COOH groups, such as acrylic acid or methacrylic acid, crotonic acid, itaconic acid, maleic acid or fumaric acid, monomers comprising sulpho groups, such as vinylsulphonic acid, allylsulphonic acid, 3-allyloxy-2-hydroxy-propanesulphonic acid, 2-acrylamido-2-methylpropanesulphonic acid (AMPS®), 2-methacrylamido-2-methylpropanesulphonic acid, 2-acrylamidobutanesulphonic acid, 3-acrylamido-3-methylbutanesulphonic acid or 2-acrylamido-2,4,4-trimethylpentanesulphonic acid, or monomers comprising phosphonic acid groups, such as vinylphosphonic acid, allylphosphonic acid, N-(meth)acrylamidoalkylphosphonic acids or (meth)acryloyloxyalkylphosphonic acids.

Mention should also be made of acrylamide and methacrylamide and derivatives thereof, for example N-methyl(meth)

acrylamide, N,N'-dimethyl(meth)acrylamide and N-methylolacrylamide, N-vinyl derivatives such as N-vinylformamide, N-vinylacetamide, N-vinylpyrrolidone or N-vinylcaprolactam, and vinyl esters such as vinyl formate or vinyl acetate. N-Vinyl derivatives can be hydrolysed after polymerization to vinylamine units, and vinyl esters to vinyl alcohol units.

Further examples include monomers comprising hydroxyl and/or ether groups, for example hydroxyethyl(meth)acrylate, hydroxypropyl(meth)acrylate, allyl alcohol, hydroxyvinyl ethyl ether, hydroxyvinyl propyl ether, hydroxyvinyl butyl ether, or compounds of the formula $H_2C=C(R^1)—COO—(—CH_2—CH(R^9)—O—)_b—R^{10}$ (IVa) or $H_2C=C(R^1)—O—(—CH_2—CH(R^9)—O—)_b—R^{10}$ (IVb), where $R^1$ is as defined above and b is a number from 2 to 200, preferably 2 to 100. The $R^9$ radicals are each independently H, methyl or ethyl, preferably H or methyl, with the proviso that at least 50 mol % of the $R^9$ radicals are H. Preferably at least 75 mol % of the $R^9$ are H, more preferably at least 90 mol %, and they are most preferably exclusively H. The $R^{10}$ radical is H, methyl or ethyl, preferably H or methyl. The individual alkylene oxide units may be arranged randomly or in blocks. In the case of a block copolymer, the transition between the blocks may be abrupt or gradual.

Suitable hydrophilic monomers (b) are also monomers having ammonium groups, especially ammonium derivatives of N-(ω-aminoalkyl)(meth)acryamides or ω-aminoalkyl (meth)acrylic esters.

More particularly, monomers (b) having ammonium groups may be compounds of the general formulae $H_2C=C(R^7)—CO—NR^{13}—R^{11}—NR^{12}{}_3{}^+X^-$ (Va) and/or $H_2C=C(R^7)—COO—R^{11}—NR^{12}{}_3{}^+X^-$ (Vb), where $R^7$ is as defined above, i.e. is H or methyl, $R^{11}$ is a preferably linear $C_1$-$C_4$-alkylene group, and $R^{13}$ is H or a $C_1$-$C_4$-alkyl group, preferably H or methyl. The $R^{12}$ radicals are each independently $C_1$-$C_4$-alkyl, preferably methyl, or a group of the general formula $—R^{14}—SO_3H$, where $R^{14}$ is a preferably linear $C_1$-$C_4$-alkylene group or a phenyl group, with the proviso that generally not more than one of the $R^{12}$ substituents is a substituent having sulpho groups. More preferably, the three $R^{12}$ substituents are each methyl groups, i.e. the monomer has a $—N(CH_3)_3{}^+$ group. $X^-$ in the above formula is a monovalent anion, for example $Cl^-$. Of course, X may also be a corresponding fraction of a polyvalent anion, though this is not preferred. Examples of suitable monomers (b) of the general formula (Va) or (Vb) include salts of 3-trimethylammoniopropylacrylamides or 2-trimethylammonioethyl(meth)acrylates, for example the corresponding chlorides such as 3-trimethylammoniopropylacrylamide chloride (DIMAPAQUAT) and 2-trimethylammonioethyl methacrylate chloride (MADAME-QUAT).

The monomer (b) may thus be an uncharged monomer (b1), and here especially a monomer selected from the group of (meth)acrylamide, N-methyl(meth)acrylamide, N,N-dimethyl(meth)acrylamide, N-methylol(meth)acrylamide, N-vinylformamide or N-vinyl-2-pyrrolidone, and the monomer (b2) may be at least one selected from the group of (meth) acrylic acid, vinylsulphonic acid, allylsulphonic acid, 2-acrylamido-2-methylpropanesulphonic acid (AMPS®), 2-methacrylamido-2-methylpropanesulphonic acid, 2-acrylamidobutanesulphonic acid, 3-acrylamido-3-methylbutanesulphonic acid or 2-acrylamido-2,4,4-trimethylpentanesulphonic acid or vinylphosphonic acid. The copolymer may additionally also comprise at least one cationic monomer (b3) having ammonium groups, where the cationic monomer comprises salts of 3-trimethylammoniopropyl(meth)acrylamides and 2-trimethylammonioethyl(meth)acrylates.

The abovementioned hydrophilic monomers can of course be used not only in the acid or base form shown, but also in the form of corresponding salts. It is also possible to convert acidic or basic groups to corresponding salts after the formation of the polymer.

As already explained, the inventive copolymer comprises, in a preferred embodiment of the invention, at least one monomer (b) comprising acidic groups. These are preferably monomers which comprise at least one group selected from the group of $—COOH$, $—SO_3H$ and $—PO_3H_2$, particular preference being given to monomers comprising COOH groups and/or $—SO_3H$ groups, and suitable salts thereof.

At least one of the monomers (b) is preferably a monomer selected from the group of (meth)acrylic acid, vinylsulphonic acid, allylsulphonic acid and 2-acrylamido-2-methylpropanesulphonic acid (AMPS®), more preferably acrylic acid and/or AMPS® or salts thereof.

Surfactant (c)

The inventive copolymers are advantageously prepared in the presence of at least one nonpolymerizable surfactant (c), which is preferably at least one nonionic surfactant. However, anionic and cationic surfactants are also suitable, to the extent that they do not take part in the polymerization reaction.

Although our prior international patent application WO 2010/133527 A2 mentioned at the outset discloses, at pages 34-45 ("part B) preparation of the hydrophobically associating copolymers"), the preparation of comparable copolymers which have been obtained without the use of a component (c) and are likewise suitable to a certain extent for achievement of the object of the invention—this part of the prior international patent application is therefore incorporated by reference into this present application text—the copolymer according to our prior international patent application WO 2011/015520 A1 mentioned at the outset, which has been prepared with addition of a surfactant, exhibits a distinct improvement in the polymer properties, especially in the thickening action, and it was also possible to significantly reduce the gel content.

In other words, it is also possible in principle not to use this surfactant, but significantly better results can be achieved using this surfactant.

The nonionic surfactant is preferably an ethoxylated, long-chain aliphatic alcohol which may optionally contain aromatic components. Examples include: $C_{12-14}$-fatty alcohol ethoxylates, $C_{16-18}$-fatty alcohol ethoxylates, $C_{13}$-oxo alcohol ethoxylates, $C_{10}$-oxo alcohol ethoxylates, $C_{13-15}$-oxo alcohol ethoxylates, $C_{10}$-Guerbet alcohol ethoxylates and alkylphenol ethoxylates.

A suitable surfactant is especially at least one representative selected from the group of the ethoxylated alkylphenols, the ethoxylated saturated iso-$C_{13}$-alcohols and/or the ethoxylated $C_{10}$-Guerbet alcohols.

Monomers (d)

In special cases, the inventive copolymers, in addition to monomers (a) and (b), may optionally also comprise monomers (d) which possess two or more, preferably two, ethylenically unsaturated groups. This can achieve a certain level of crosslinking of the copolymer, provided that this does not have any undesired adverse effects in the intended use of the copolymer. Too high a degree of crosslinking should, however, be avoided in any case; more particularly, the required water solubility of the copolymer must not be impaired. Whether a low level of crosslinking may be advisable in the individual case is guided by the particular use of the copolymer, and the person skilled in the art makes an appropriate selection.

Examples of suitable monomers (d) include 1,4-butanediol di(meth)acrylate, 1,6-hexanediol di(meth)acrylate, 1,3-butylene glycol di(meth)acrylate, neopentyl glycol di(meth)acrylate, ethylene glycol di(meth)acrylate, diethylene glycol di(meth)acrylate, triethylene glycol di(meth)acrylate or oligoethylene glycol di(meth)acrylates, for example polyethylene glycol bis(meth)acrylate, N,N'-methylenebis(meth)acrylamide, ethylene glycol divinyl ether, triethylene glycol divinyl ether, triallylamine, triallylaminemeth-ammonium chloride, tetraallylammonium chloride or tris(2-hydroxyethyl) isocyanurate tri(meth)acrylate.

If present at all, crosslinking monomers (d), however, are used only in small amounts. In general, the amount of the monomers (d) should not exceed 1.0% by weight based on the amount of all monomers used. Preferably not more than 0.5% by weight and more preferably not more than 0.1% by weight should be used. The type and amount of the crosslinker are determined by the person skilled in the art according to the desired use of the copolymer.

Preferably in accordance with the invention, the copolymer is used as a thickening rheological additive for hydraulic fracturing. Said copolymer can also be used as a thickening rheological additive for completion fluids, spacer fluids and drilling fluids, or else as a thickening rheological additive and/or as a stabilizer for foams.

The inventive use is effected preferably at a temperature in the range from 40° C. to 120° C., more preferably at 50° C. to 100° C.

Overall, monomer component (a) should be present in amounts of 0.1 to 20.0% by weight, preferably of 0.1 to 5% by weight, monomer component (b) in amounts of 50.0 to 99.8% by weight, and surfactant (c) in amounts of 0.1 to 10.0% by weight, based in each case on the total amount of all components in the copolymer. The exact amount is guided by the type and the desired end use of the hydrophobically associating copolymers and is determined correspondingly by the person skilled in the art.

More preferably, $R^3$ of monomer component (a) of the formula (I) is a hydrocarbyl radical having at least 3 carbon atoms.

More preferably, with regard to monomer component (a) of the formula (I), $R^1$ is H and $R^4$ is a group selected from —$CH_2$— and —O—$CH_2$—$CH_2$—$CH_2$—$CH_2$—.

As already detailed above, the at least one monomer (b) is preferably a monomer comprising acidic groups and/or salts thereof. The acidic groups are preferably at least one group selected from —COOH, —$SO_3H$ and —$PO_3H_2$, and salts thereof.

It is generally considered to be preferred when the copolymer is a copolymer (A1) which comprises at least two different hydrophilic monomers (b), which comprise at least
one uncharged hydrophilic monomer (b1), preferably acrylamide, and
at least one hydrophilic anionic monomer (b2) which comprises at least one acidic group selected from —COOH, —$SO_3H$ and —$PO_3H_2$,
where the amount of the monomers (a) is 0.1 to 20% by weight and that of all monomers (b) together is 70 to 99.5% by weight, based on the amount of all monomers in the copolymer.

The preferred uncharged monomers (b1) are (meth)acrylamide, N-methyl(meth)acrylamide, N,N-dimethyl(meth)acrylamide, N-methylol(meth)acrylamide, N-vinylformamide and N-vinyl-2-pyrrolidone, and the monomer (b2) is at least one monomer selected from the group of (meth)acrylic acid, vinylsulphonic acid, allylsulphonic acid, 2-acrylamido-2-methylpropanesulphonic acid (AMPS®), 2-methacrylamido-2-methylpropanesulphonic acid, 2-acrylamidobutanesulphonic acid, 3-acrylamido-3-methylbutanesulphonic acid, 2-acrylamido-2,4,4-trimethylpentanesulphonic acid and vinylphosphonic acid.

The inventive copolymer may additionally also comprise at least one cationic monomer (b3) having ammonium groups, more preferably salts of 3-trimethylammoniopropyl (meth)acrylamides and/or 2-trimethylammonioethyl(meth)acrylates.

In addition, it is considered to be preferred when the copolymer is a copolymer (A2) which comprises at least two different hydrophilic monomers (b), which are at least
one uncharged hydrophilic monomer (b1), and
at least one cationic monomer (b3),
where the amount of the monomers (a) is 0.1 to 20% by weight and that of all monomers (b) together is 70 to 99.9% by weight, based on the amount of all monomers in the copolymer.

Finally, it is considered to be preferred when the copolymer is a copolymer (A3) which comprises at least two different hydrophilic monomers (b), which are at least
5 to 50% by weight of at least one uncharged hydrophilic monomer (b1), and
25 to 94.9% by weight of at least one anionic monomer (b2) comprising sulpho groups,
where the amount of the monomers (a) is 0.1 to 20% by weight and that of all monomers (b) together is 70 to 99.9% by weight, based on the amount of all monomers in the copolymer, More preferably, the inventive copolymer also comprises up to 1% by weight of the crosslinking monomer (d) which comprises at least two ethylenically unsaturated groups and has already been mentioned above, where monomer (d) comprises at least one monomer selected from the group of triallylamine, triallylmethylammonium chloride, tetraallylammonium chloride, N,N'-methylenebisacrylamide, triethylene glycol bismethacrylate, triethylene glycol bisacrylate, polyethylene glycol(400)bismethacrylate and polyethylene glycol(400)bisacrylate.

Preparation of the Water-Soluble Hydrophobically Associating Copolymer

The inventive copolymers can be prepared by methods known in principle to those skilled in the art, by free-radical polymerization of the monomers (a), (b) and optionally (d), for example by solution or gel polymerization in the aqueous phase.

The monomers (a) of the formula (I) used in accordance with the invention are more preferably provided by the above-described preparation process by alkoxylating ethylenically unsaturated alcohols, for example hydroxybutyl vinyl ether, optionally followed by an etherification.

In a preferred embodiment, the preparation is undertaken by means of gel polymerization in the aqueous phase. For gel polymerization, a mixture of the monomers (a), (b) and optionally (d), initiators, the surfactant (c) and other assistants with water is first provided. Acidic monomers can be neutralized completely or partially before the polymerization. Preference is given to a pH of approx. 4 to approx. 9. The concentration of all components except the solvents is typically approx. 20 to 60% by weight, preferably approx. 30 to 50% by weight.

It is recommended to subject at least one hydrophobically associating monomer (a) and at least one hydrophilic monomer (b) to an aqueous solution polymerization in the presence of at least one surfactant (c), preferably by initially charging monomer component (a) and then successively adding monomer component (b) and component (c). In addition, it is optionally possible to add a mixture containing monomer component (b) and component (c) to monomer component (a). However, the invention also includes addition of component (c) to monomer component (a), and subsequent addition of monomer component (b) to the mixture obtained. The polymerization should be performed especially at a pH in the range from 5.0 to 7.5 and preferably at a pH of 6.0.

It is important to add the surfactant (c) to the reaction solution before the initiation of the polymerization, though the sequence of addition of monomers (a) and (b) and of component (c)—as just described—can be selected substantially freely.

The mixture is subsequently polymerized thermally and/or photochemically, preferably at −5° C. to 50° C. If polymerization is effected thermally, preference is given to using polymerization initiators which can initiate even at comparatively low temperature, for example redox initiators. The thermal polymerization can be undertaken even at room temperature or by heating the mixture, preferably to temperatures of not more than 50° C. The photochemical polymerization is typically undertaken at temperatures of −5° C. to 10° C. Particularly advantageously, photochemical and thermal polymerization can be combined with one another, by adding both initiators for the thermal and photochemical polymerization to the mixture. In this case, the polymerization is first initiated photochemically at low temperatures, preferably −5 to +10° C. The heat of reaction released heats the mixture, which additionally initiates the thermal polymerization. By means of this combination, it is possible to achieve a conversion of more than 99%

The gel polymerization is generally effected without stirring. It can be effected batchwise by irradiating and/or heating the mixture in a suitable vessel at a layer thickness of 2 to 20 cm. The polymerization gives rise to a solid gel. The polymerization can also be effected continuously. For this purpose, a polymerization apparatus is used, which possesses a conveyor belt to accommodate the mixture to be polymerized. The conveyor belt is equipped with devices for heating or for irradiating with UV radiation. In this method, the mixture is poured onto one end of the belt by means of a suitable apparatus, the mixture is polymerized in the course of transport in belt direction, and the solid gel can be removed at the other end of the belt.

The gel obtained is preferably comminuted and dried after the polymerization. The drying should preferably be effected at temperatures below 100° C. To prevent conglutination, it is possible to use a suitable separating agent for this step. This gives the hydrophobically associating copolymer as granules or powder.

Further details of the performance of a gel polymerization are disclosed, for example, in DE 10 2004 032 304 A1, paragraphs [0037] to [0041].

The inventive copolymers preferably possess a number-average molecular weight $M_n$ of 50 000 to 25 000 000 g/mol.

Since the polymer powder or granules obtained are generally used in the form of an aqueous solution in the course of application at the site of use, the polymer has to be dissolved in water on site. This may result in undesired lumps with the high molecular weight polymers described. In order to avoid this, it is possible to add an assistant which accelerates or improves the dissolution of the dried polymer in water to the inventive polymer as early as in the course of synthesis. This assistant may, for example, be urea.

Use of the Water-Soluble Hydrophobically Associating Copolymer

The hydrophobically associating copolymer can, as already mentioned at the outset, be used in accordance with the invention for thickening of aqueous phases.

The selection of the type and amount of the monomers (a), (b), (c) and (d) can be used to adjust the properties of the copolymers to the particular technical requirements.

The use concentration is determined by the person skilled in the art according to the type of aqueous phase to be thickened and the type of the copolymer. In general, the concentration of the copolymer is 0.05 to 5% by weight based on the aqueous phase, preferably 0.1 to 2% by weight and more preferably 0.15 to 1% by weight.

The aqueous phases to be thickened are, as already mentioned above, for example, formulations for hydraulic fracturing, completion fluids, spacer fluids and drilling fluids, and also aqueous formulations to generate foam.

The copolymers can be used here alone, or else in combination with other thickening components, for example together with other thickening polymers. They can also be formulated, for example, together with surfactants to give a thickening system. The surfactants can form micelles in aqueous solution, and the hydrophobically associating copolymers can form, together with the micelles, a three-dimensional thickening network.

For use, the copolymer can be dissolved directly in the aqueous phase to be thickened. It is also conceivable to predissolve the copolymer and then to add the solution formed to the system to be thickened.

Figure 2:
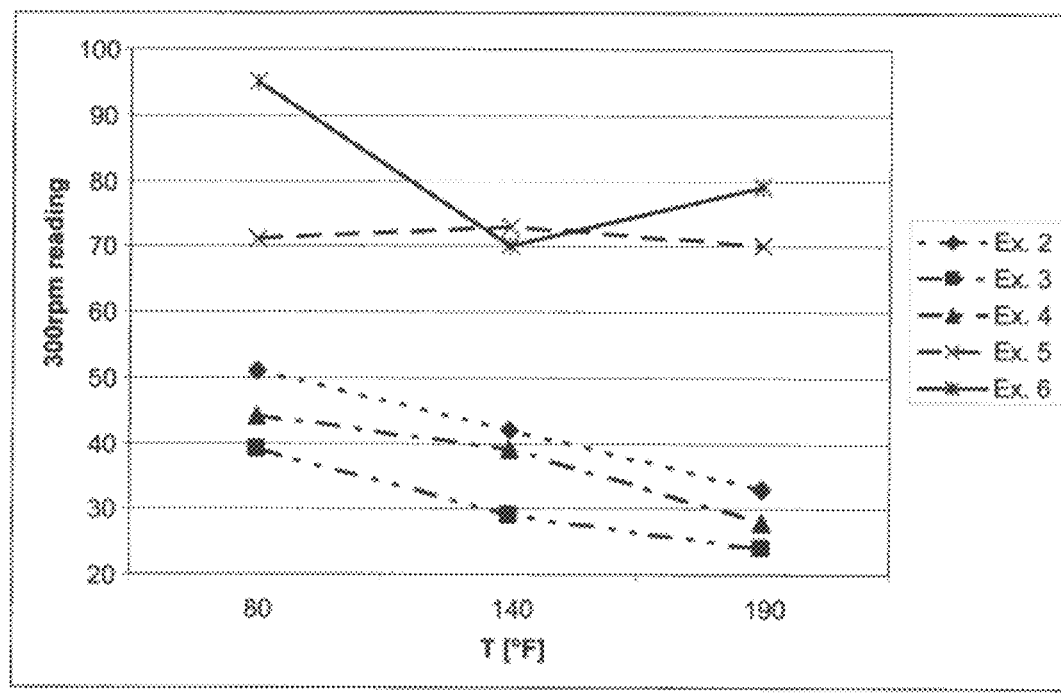
Figure 3:
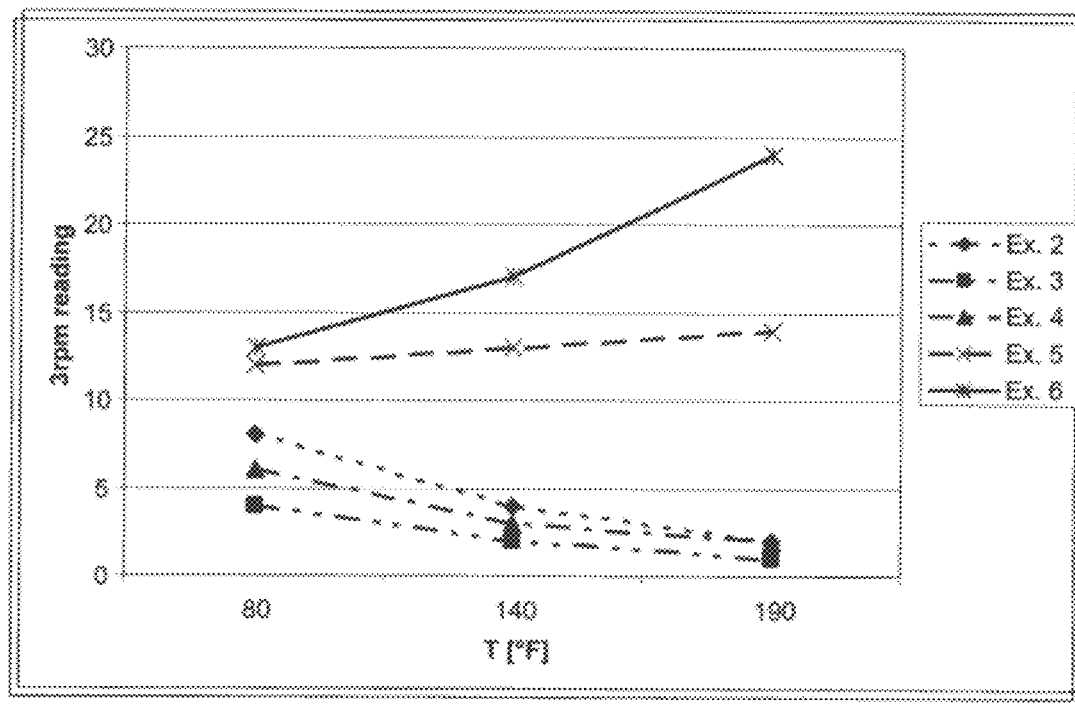
Figure 4:
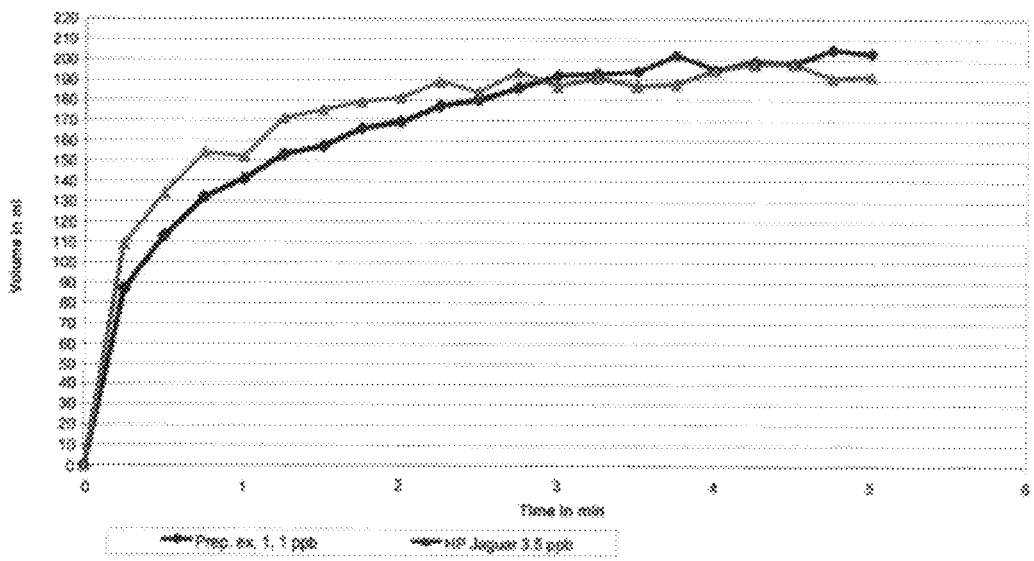
Figure 5:
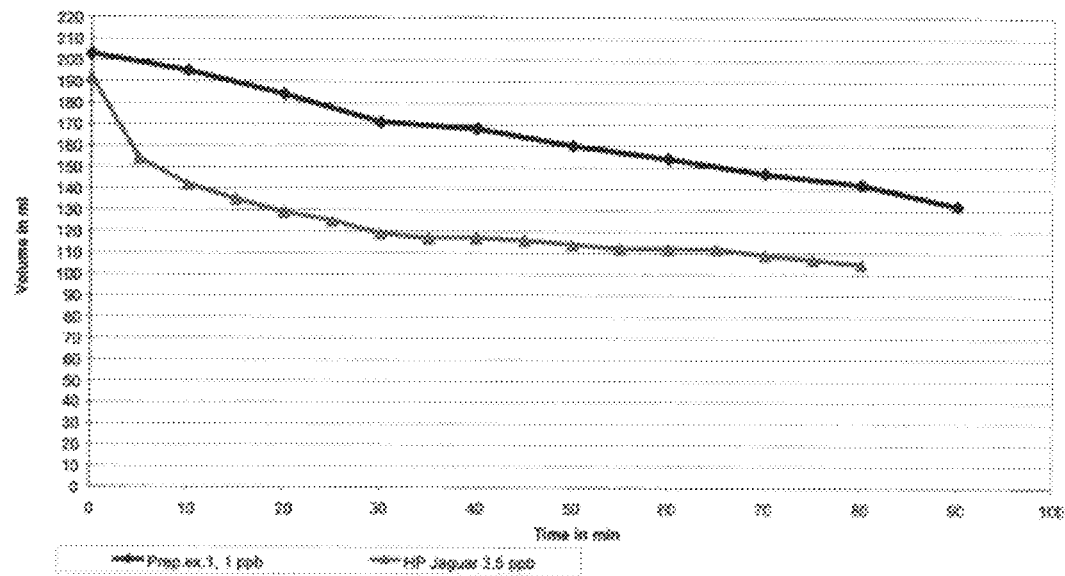
Figure 6:
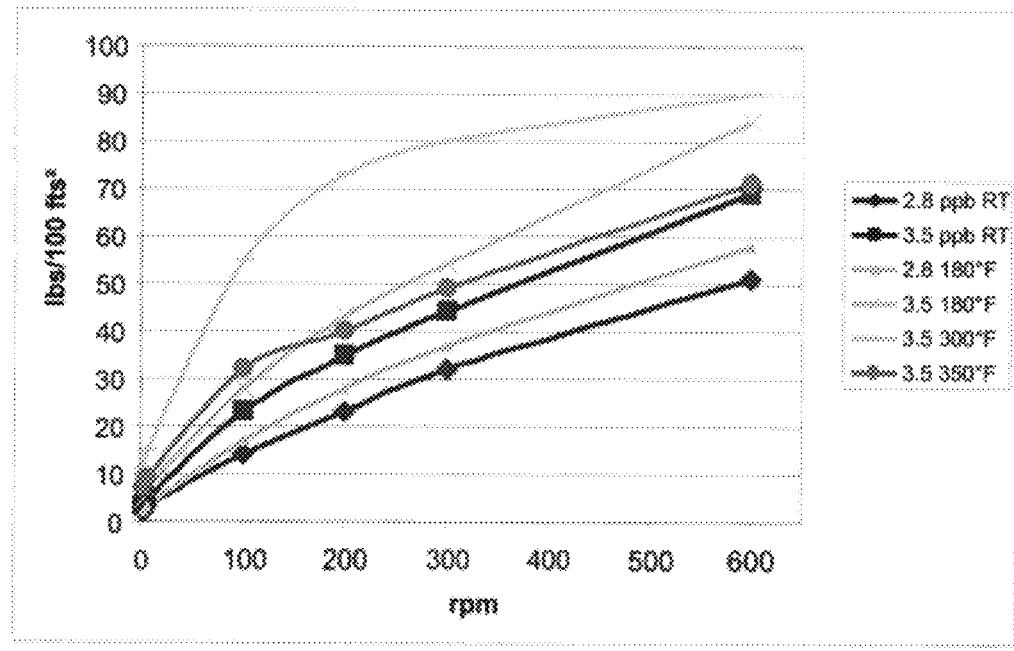
Figure 7:
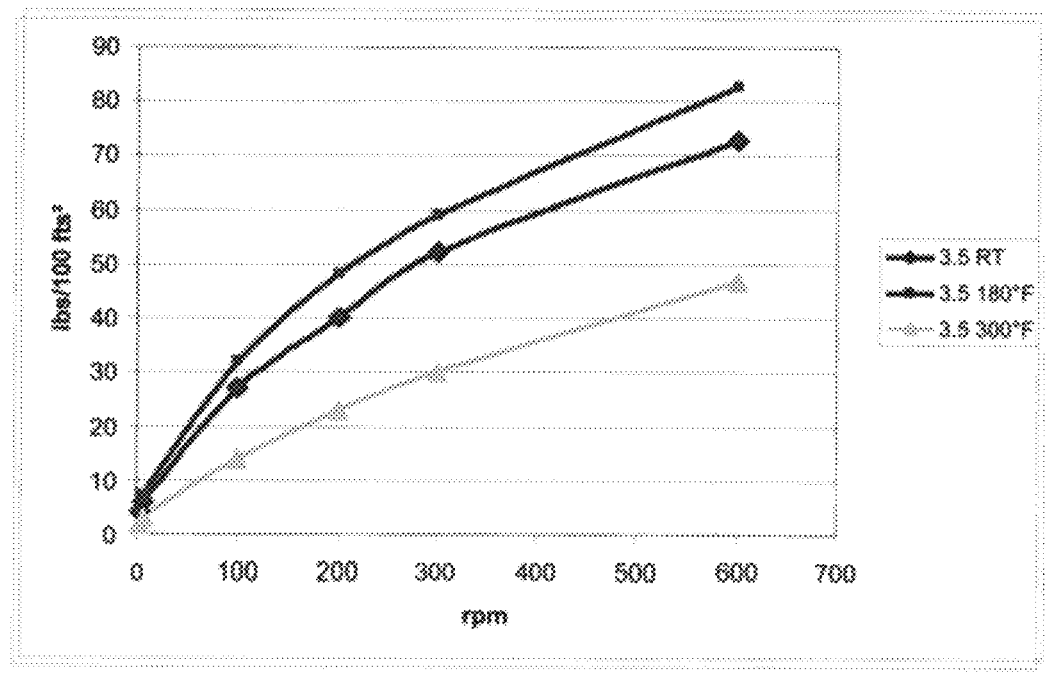
Figure 8:
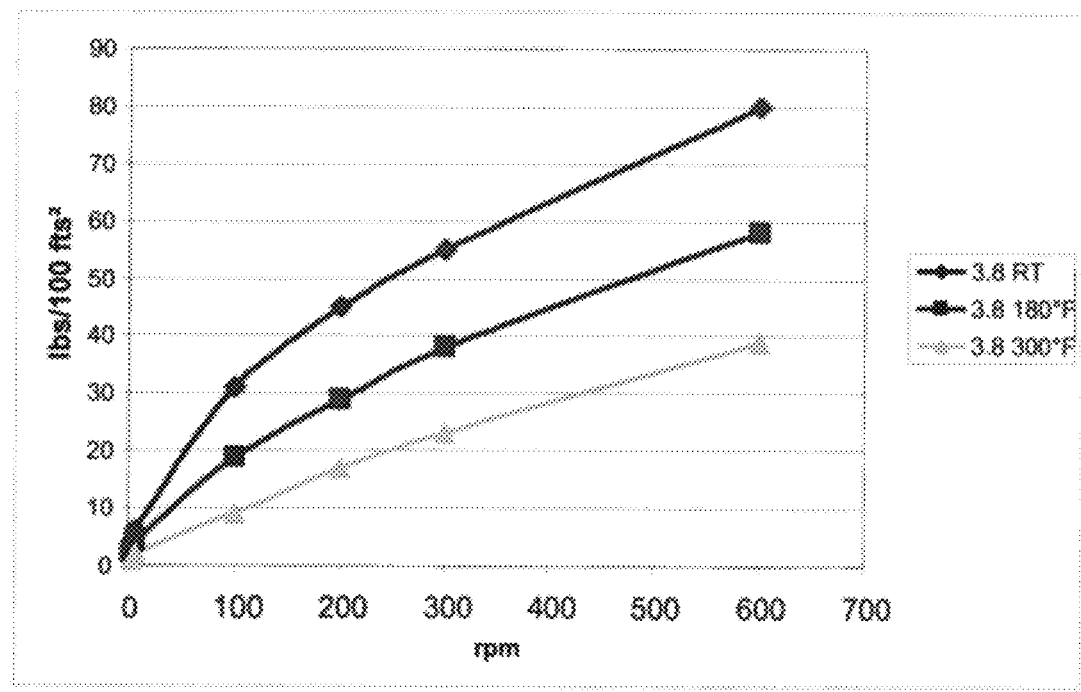

The examples which follow are intended to illustrate the invention in more detail and with reference to the accompanying drawings. Herein:

FIG. 1 shows a graphical representation of the viscosity of an aqueous solution of a copolymer according to the invention over temperature, FIG. 2 shows a graphical representation of rheological data measured at 300 rpm, FIG. 3 shows a graphical representation of rheological data measured at 3 rpm, FIG. 4 shows a graphical representation of foam buildup data on a SITA foam tester, FIG. 5 shows a graphical representation of foam collapse data on a SITA foam tester, FIG. 6 shows a graphical representation of Fann-35 data measured in $HCO_2Na$ brine, FIG. 7 shows a graphical represent of Fann-35 data measured in $CaCl_2/CaBr_2$ brine, FIG. 8 shows a graphical representation of Fann-35 data measured in $CaBr_2$ brine.

EXAMPLES

1. Preparation Process 1.1 Preparation Example 1 (Comparative)

Without Addition of Surfactant During the Polymerization

A 3 l vessel with stirrer and thermometer is initially charged with 242.5 g of a 50% Na-AMPS® solution (AMPS® 2405, from Lubrizol). 295.8 g of water were added while stirring. Subsequently, 1.2 g of Surfynol DF 58 and 0.4 g of Baysilone EN (from Bayer) as defoamers were added successively. After addition of 4.6 g of Pluriol A1190V+ 12PeO (development product from BASF consisting of hydroxybutyl vinyl ether having 25 ethylene oxide units and 12 pentene oxide units), 228.8 g of a 50% acrylamide solution (from Cytec) were added. After addition of 2.4 g of a 5% Versenex solution to destabilize the acrylamide solution, the pH was adjusted to 6.0 with a 20% NaOH solution and/or a 20% $H_2SO_4$ solution. During the inertization by purging with nitrogen for 30 minutes, the solution was cooled to approx. 20° C. Subsequently, the solution was transferred to a plastic vessel of dimensions (w*d*h) 15 cm*10 cm*20 cm, and 16.0 g (200 ppm) of 10% 2,2'-azobis(2-amidinopropane)dihydrochloride, 0.5 g (10 ppm) of 1% bisulphite solution, 8 g (6 ppm) of 0.1% tert-butyl hydroperoxide solution and 4.0 g (5 ppm) of 1% iron(II) sulphate solution were added successively.

The polymerization was initiated by irradiating with UV light (two Philips tubes; Cleo Performance 40 W). After approx. 2-3 h, the cut-resistant gel was removed from the plastic vessel and cut with scissors into gel cubes of approx. 5 cm*5 cm*5 cm in size. Before the gel cubes were comminuted with a conventional meat grinder, they were lubricated with the separating agent Sitren 595 (polydimethylsiloxane emulsion; from Goldschmidt). The separating agent is a polydimethylsiloxane emulsion which has been diluted 1:20 with water.

The gel granules obtained were subsequently distributed homogeneously on drying grids and dried to constant weight under reduced pressure at approx. 90-120° C. in a forced-air drying cabinet. Approx. 500 g of white hard granules were obtained, which were converted to a pulverulent state with the aid of a centrifugal mill.

1.2 Preparation Examples 2-4 (Inventive)

With Surfactant Addition During the Gel Polymerization

In addition to the monomer solution as described in comparative example 1, the surfactant Lutensol TO15 (from BASF, $C_{13}$-oxo alcohol ethoxylate+15 ethylene oxide units) was dissolved in the following amounts in the monomer solution before the polymerization:

Preparation ex. 2: 1% Lutensol 1015 (corresponds to 2.4 g)
Preparation ex. 3: 2% Lutensol TO15 (corresponds to 4.8 g)
Preparation ex. 4: 3% Lutensol TO15 (corresponds to 7.2 g)

1.3 Preparation Examples 5-10 (Inventive)

Proceeding from preparation ex. 3, the following polymers were produced with alternative surfactants to Lutensol TO 15 (measurement of the viscosity as described in use ex. 1):

|  | Surfactant | Viscosity [mPa*s] |
|---|---|---|
| Preparation ex. 3 | 2% Lutensol TO 15 ($C_{13}$-oxo alcohol ethoxylate + 15 EO) | 230 |
| Preparation ex. 5 | 2% Lutensol AP 10 (alkylphenol + 10 EO) | 390 |
| Preparation ex. 6 | 2% Lutensol XL100 ($C_{10}$-Guerbet alcohol + 10 EO) | 140 |
| Preparation ex. 7 | 2% Lutensol XP100 ($C_{10}$-Guerbet alcohol + 10 EO) | 80 |
| Preparation ex. 8 | 2% sodium dodecylsulphonate (SDS) | 100 |
| Preparation ex. 9 | 2% dodecyltrimethylammonium chloride | 150 |
| Preparation ex. 10 | 2% Lutensol TO 10 ($C_{13}$-oxo alcohol ethoxylate + 10 EO) | 270 |

As can be seen from the data, not only Lutensol TO 15 but also other nonionic surfactants, and also anionic and cationic surfactants, can be used in the synthesis of the inventive copolymers.

1.4 Preparation Example 11 (Inventive)

In analogy to preparation example 3, a copolymer was produced with an alternative water-soluble hydrophobically associating monomer to Pluriol A1190V+12PeO. This monomer consists of a $C_{12}$-alcohol ethoxylated with 7 EO, which was subsequently reacted with methacrylic anhydride (Genagen LA070MA from Clariant). The mass of the Genagen used corresponds to that of the Pluriol A1190V+12PeO in preparation ex. 3.

The measurement of the viscosity as in use ex. 1 gave a value of 780 mPas. This preparation example shows that different water-soluble hydrophobically associating monomers can be used.

1.5 Preparation Example 12 (Inventive)

In analogy to preparation example 3, a mixed ionic copolymer was produced. This copolymer contains, in addition to AMPS®, acrylamide and Pluriol A1190V+12PeO, the cationic monomer 3-trimethylammoniopropylmethacrylamide chloride (DIMAPAQUAT). The molar ratio of the monomers is AMPS®:acrylamide:DIMAPAQUAT:Pluriol A1190V+12PeO=30:37:32:1. The measurement of the viscosity as described in use ex. 1 gave a value of 56 mPas.

1.6 Preparation Example 13 (Inventive)

In analogy to preparation example 3, a copolymer which contains, instead of 4.6 g of Pluriol A1190V+12PeO, the same molar amount of Pluriol A1190V+16PeO (development product from BASF consisting of hydroxybutyl vinyl ether with 25 ethylene oxide units and 16 pentene oxide units) was produced. The measurement of the viscosity as described in use ex. 1 gave a value of 77 mPas.

1.7 Preparation Example 14 (Inventive)

In analogy to preparation example 3, a copolymer which contains, instead of Na-AMPS®, the sodium salt of acrylic acid was produced. The proportions by mass of the monomers were 28% sodium acrylate, 70% acrylamide and 2% Pluriol A1190V+12PeO. The surfactant added was 4.8 g of Lutensol AP 10 (BASF). The solids content of the polymerized gel was 19.5%. The measurement of the viscosity as described in use ex. 1 gave a value of 49 mPas.

1.8 Preparation Example 15 (Inventive)

In analogy to preparation example 3, a copolymer in which the Na-AMPS® has been partly replaced by the sodium salt of acrylic acid was produced. The proportions by mass of the monomers were 28% AMPS®, 20% sodium acrylate, 50% acrylamide and 2% Pluriol A1190V+12 PeO. The surfactant added was 4.8 g of Lutensol TO 15 (BASF). The measurement of the viscosity as described in use ex. 1 gave a value of 40 mPas.

1.9 Preparation Example 16 (Inventive)

This example describes an alternative polymerization process to preparation example 5.

A plastic bucket with magnetic stirrer, pH meter and thermometer was initially charged with 121.2 g of Na-AMPS® (50% solution) to which were subsequently added 155 g of distilled water, 0.6 g of Surfynol, 0.2 g of Baysilone, 2.3 g of Pluriol A1190V+12 PeO, 114.4 g of acrylamide (50% solution), 1.2 g of Versenex (5% solution) and 2.4 g of Lutensol AP10. After adjustment to pH 6.0 with a 20% or 2% sulphuric acid solution and addition of the rest of the water (total amount of water minus the amount of water already added, minus the amount of acid required), the monomer solution was adjusted to the start temperature of 20° C. The solution was transferred into a thermos flask, the temperature sensor for temperature recording was mounted and the mixture was purged with nitrogen for 30 minutes. At the end of the nitrogen purging, the online measurement of the temperature was started, the start temperature was checked once more and adjusted, and 1.6 ml of a 10% V50 solution, 0.12 ml of a 1% t-BHPO solution and 0.24 ml of a 1% sodium sulphite solution were added successively. As the monomer solution began to thicken, the nitrogen frit was removed from the monomer solution. Once the temperature of the gel block had attained its maximum, the temperature sensor was removed and the thermos flask was placed into a drying cabinet at 80° C. for two hours. Thereafter, the gel block was removed from the thermos flask and approx. 0.5-1 cm of the surface was removed with scissors and discarded. The remainder was halved, painted with the separating agent Comperlan COD (coconut fatty acid diethanolamide) and comminuted with the aid of a meat grinder. The gel granules obtained were dried in a fluidized bed dryer at 55° C. for two hours. This gave white hard granules which were converted to a pulverulent state by means of a centrifugal mill.

1.10 Preparation Example 17 (Inventive)

Analogous to preparation example 16, but with use of 6 g of Pluriol A1190V+12 PeO and 6 g of Lutensol AP10.

2. Properties of the Copolymer 2.1 Analysis 1

The polymers of preparation examples 1-4 were dissolved in synthetic seawater to DIN 50900 (salt content 35 g/l), such that a polymer concentration of 4000 ppm was attained. The viscosity of these solutions was measured on a Haake rheometer with a double slit geometry at $7^{-1}$ and 60° C.

| Polymer | Viscosity [mPa*s] |
| --- | --- |
| Preparation ex. 1 | 24 |
| Preparation ex. 2 | 360 |
| Preparation ex. 3 | 230 |
| Preparation ex. 4 | 80 |

It is clear that the addition of the Lutensol TO 15 during the polymerization significantly increases the viscosity of the polymers, in addition, the amount of surfactant added has a clear influence on the viscosity.

2.2 Analysis 2

In order to show that the inventive polymers are not merely a physical mixture of the polymer from preparation ex. 1 and the surfactant, but that the polymer structure is crucially influenced during the polymerization reaction, the viscosities of mixtures of the polymer from preparation ex. 1 with the surfactant Lutensol TO 15 were also measured:

| | Viscosity [mPas] | Viscosity of the mixture of preparation ex. 1 with the corresponding amount of Lutensol TO 15 [mPas] |
| --- | --- | --- |
| Preparation ex. 2 | 360 | 25 |
| Preparation ex. 3 | 230 | 26 |
| Preparation ex. 4 | 80 | 20 |

As can be seen from these analyses, a subsequent addition of the surfactant does not have any positive influence on the viscosity of the polymer.

For more detailed examination of the mechanism of action, the polymer from preparation example 3 was refluxed in a Soxhlet with toluene over a period of 48 h. This extracted 90% of Lutensol TO 15 originally present from the copolymer. However, the high viscosity of the polymer was preserved even after the virtually complete extraction of the surfactant.

This indicates that the surfactant is not incorporated or grafted covalently into the copolymer, but rather that the addition of surfactant positively influences the formation of the polymer structure. This could be rationalized in that the surfactant forms mixed micelles with the hydrophobically associating monomer.

2.3 Analysis 3

1 g of the particular copolymer of preparation examples 1-4 was stirred into 249 g of synthetic seawater to DIN 50900 (salt content 35 g/l) for 24 h until complete dissolution. Subsequently, the solution was filtered through a screen with mesh size 200 μm and the volume of the residue remaining on the screen was measured. The value obtained corresponds to the gel content.

| Polymer | Gel content [ml] |
| --- | --- |
| Preparation ex. 1 (comparative) | 45 |
| Preparation ex. 2 (inventive) | 9 |
| Preparation ex. 3 (inventive) | 5 |
| Preparation ex. 4 (inventive) | <1 |

As can be seen from the data, the gel content is reduced significantly as a result of the surfactant addition. With rising amount of surfactant, it is possible to reduce the gel content down to below the detection limit.

2.4 Use Example 1 (Inventive)

FIG. 1 shows the profile of the viscosity of an aqueous solution of preparation example 16 (c=1200 ppm in 9% salt solution, measured at 6 rpm with Brookfield LV and UL adapter). In the case of a temperature rise from 20 to 30° C., a small decline in viscosity is observed at first, then the viscosity rises significantly and passes through a maximum in the region of 50-60° C., in order then to decrease continuously as the temperature rises further.

3. Use as a Thickener in Hydraulic Fracturing 3.1 Use Example 2 (Comparative)

The table below shows the rheological properties of a 0.6% solution of hydroxypropylguar (Jaguar® HP-8, from Rhodia) at different temperatures and speeds (measured at Fann 35).

| Solvent | Temperature [° F.] | Fann 35 values [lb/100 sqf] at . . . rpm | | | | | |
|---|---|---|---|---|---|---|---|
| | | 300 | 200 | 100 | 6 | 3 | 600 |
| Tap water | 80 | 51 | 44 | 34 | 11 | 8 | 65 |
| | 140 | 42 | 35 | 27 | 8 | 4 | 50 |
| | 190 | 33 | 29 | 21 | 4 | 2 | 43 |
| Seawater | 80 | 50 | 42 | 33 | 10 | 8 | 64 |
| | 140 | 38 | 32 | 24 | 6 | 3 | 48 |
| | 190 | 27 | 21 | 14 | 2 | 0 | 35 |

3.2 Use Example 3 (Comparative)

The table below shows the rheological properties of a 0.6% solution of hydroxypropylguar (Galctasol® 40H4FDS1, from Ashland Aqualon) at different temperatures and speeds (measured with Fann 35).

| Solvent | Temperature [° F.] | Fann 35 values [lb/100 sqf] at . . . rpm | | | | | |
|---|---|---|---|---|---|---|---|
| | | 300 | 200 | 100 | 6 | 3 | 600 |
| Tap water | 80 | 39 | 32 | 24 | 6 | 4 | 51 |
| | 140 | 29 | 24 | 18 | 3 | 2 | 38 |
| | 190 | 24 | 19 | 14 | 2 | 1 | 32 |
| Seawater | 80 | 44 | 37 | 28 | 6 | 3 | 60 |
| | 140 | 36 | 30 | 22 | 4 | 2 | 47 |
| | 190 | 29 | 24 | 16 | 3 | 2 | 37 |

3.3 Use Example 4 (Comparative)

The table below shows the rheological properties of a 0.6% solution of carboxymethylhydroxypropylguar (Galctasol® 60H3FDS, from Ashland Aqualon) at different temperatures and speeds (measured with Fann 35).

| Solvent | Temperature [° F.] | Fann 35 values [lb/100 sqf] at . . . rpm | | | | | |
|---|---|---|---|---|---|---|---|
| | | 300 | 200 | 100 | 6 | 3 | 600 |
| Tap water | 80 | 44 | 37 | 29 | 9 | 6 | 56 |
| | 140 | 39 | 33 | 25 | 5 | 3 | 47 |
| | 190 | 28 | 24 | 17 | 3 | 2 | 36 |
| Seawater | 80 | 54 | 47 | 37 | 12 | 8 | 69 |
| | 140 | 41 | 36 | 28 | 8 | 4 | 51 |
| | 190 | 33 | 28 | 21 | 3 | 2 | 41 |

3.4 Use Example 5 (Inventive)

The table below shows the rheological properties of a 0.6% solution of preparation example 16 at different temperatures and speeds (measured with Fann 35).

| Solvent | Temperature [° F.] | Fann 35 values [lb/100 sqf] at . . . rpm | | | | | |
|---|---|---|---|---|---|---|---|
| | | 300 | 200 | 100 | 6 | 3 | 600 |
| Tap water | 80 | 71 | 67 | 50 | 17 | 12 | 108 |
| | 140 | 73 | 60 | 45 | 17 | 13 | 91 |
| | 190 | 70 | 56 | 41 | 18 | 14 | 78 |
| Seawater | 80 | 35 | 27 | 17 | 3 | 2 | 49 |
| | 140 | 40 | 33 | 26 | 10 | 8 | 47 |
| | 190 | 37 | 27 | 17 | 7 | 5 | 41 |

3.5 Use Example 6 (Inventive)

The table below shows the rheological properties of a 0.6% solution of preparation example 2 at different temperatures (measured with Fann 35).

| Solvent | Temperature [° F.] | Fann 35 values [lb/100 sqf] at . . . rpm | | | | | |
|---|---|---|---|---|---|---|---|
| | | 300 | 200 | 100 | 6 | 3 | 600 |
| Tap water | 80 | 95 | 72 | 50 | 20 | 13 | 119 |
| | 140 | 70 | 65 | 51 | 20 | 17 | 85 |
| | 190 | 79 | 66 | 53 | 27 | 24 | 92 |
| Seawater | 80 | 35 | 28 | 18 | 4 | 3 | 51 |
| | 140 | 65 | 56 | 48 | 20 | 14 | 64 |
| | 190 | 45 | 32 | 28 | 11 | 9 | 55 |

To illustrate the above data, the values measured at 300 rpm and 3 rpm in tap water were summarized in FIG. 2 and FIG. 3, respectively.

As can be seen from FIGS. 2 and 3, the viscosity values of the inventive copolymers at room temperature are firstly higher than those of the commercial polymers used to date; secondly, no significant decline in viscosity is observed with rising temperature, and it is even possible to observe a rise at the low shear rates.

The comparatively high viscosity values at the low shear rates are particularly advantageous for use as a thickener in hydraulic fracturing, since proppants are generally pumped together with the polymer solution in this use. Thus, settling of these proppants is prevented.

4. Use as a Thickener or Stabilizer for Foams

4.1 Use Example 7 (inventive)

350 g of tap water were weighed into a beaker, 1 g of the polymer from preparation example 17 was added while stirring, the mixture was stirred at 400 rpm for 30 min, then the stirrer was switched to approx. 200 rpm, and the mixture was left to stir overnight. 300 g of this mixture were introduced into the glass container of a Waring blender. 0.125% (0.38 g) of foaming agent (Lutensol GD 70, alkyl polyglucoside, from BASF) was added and the mixture was stirred in the Waring blender at 12 000 rpm for 15 sec. 60 g of this foam were weighed into a plastic bottle and made up to a total of 300 g with tap water (20% dilution). This mixture was then analyzed on an SITA foam tester.

4.2 Use Example 8 (Comparative)

350 g of tap water were weighed in, and 3.5 g of Jaguar® HP 8 (hydroxypropylguar, from Rhodia) were added while stirring in a Hamilton Beach mixer. This was followed by stirring at the "low speed" setting for 20 min. 300 g of this mixture were introduced into the glass container of a Waring blender, 0.125% (0.38 g) of foaming agent (Lutensol GD 70, alkyl polyglucoside, from BASF) were additionally added, and the mixture was stirred at 12 000 revolutions on the Waring blender for 15 sec. 60 g of this foam were weighed out into a plastic bottle and made up to 300 g with tap water (20% dilution). This mixture was then likewise analysed on an SITA foam tester.

The test parameters of use examples 7 and 8 are reproduced in the table below, and the results are given in form of graphical representations in FIG. 4 (foam buildup) and FIG. 5 (foam collapse).

SITA Foam Tester—Test Parameters

| Parameter: | | | |
|---|---|---|---|
| V (Sample): | 250 ml | | |
| N (Rotor): | 2000 R/min | T (Sample): | 20.0° C. ± 0.5 K |
| t (Stir): | 15 s | Cleaning: | short |

It appears from FIG. 4 that, in order to achieve an equally good foam structure as compared to that with the commercial Jaguar® HP 8 thickener, only 1 ppb ("pound per barrel") of the inventive copolymer is needed instead of 3.5 ppb.

Moreover, it appears from FIG. 5 that the foam collapse in the case of use of the inventive copolymer is much slower and more homogeneous than with the commercial Jaguar® HP thickener.

5. Thickener for Drilling Muds

The tests were performed according to API RP 131 "Recommended Practice for Laboratory Testing of Drilling Fluids".

5.1 Use Example 9

350 ml of distilled water were introduced into a 600 ml beaker. A stirrer with stirrer shaft was clamped into the precision glass stirrer and immersed into the beaker. The stirrer was set to 300 rpm and the polymer was added slowly. The stirrer was throttled to 200 rpm after approx. 30 min; the mixture was stirred for a further 17 hours. Subsequently, the rheology and the pH of the solution were measured.

Thereafter, the solution was introduced into an ageing cell. The cell was vented and subjected to ageing in a roller kiln for 16 hours (temp.: 250° C., pressure: 250 psi). After the ageing, the rheology was analysed again. The results are reproduced in the table below.

| Polymer | ppb | Fann-35 before ageing 600-300-200-100-6-3 | PV | YP | Fann-35 after ageing 600-300-200-100-6-3 | PV | YP |
|---|---|---|---|---|---|---|---|
| Prep. Ex. 16 | 1.0 | 43-30-28-20-7-6 | 13 | 17 | 34-25-23-17-5-4 | 9 | 16 |
| | 1.5 | 68-58-41-31-13-10 | 10 | 48 | 49-37-31-24-7-5 | 12 | 25 |
| Prep. Ex. 17 | 1.0 | 72-53-44-34-14-11 | 19 | 34 | 40-29-25-18-5-4 | 11 | 18 |
| | 1.5 | 114-86-73-57-24-20 | 28 | 58 | 66-48-40-30-9-6 | 18 | 30 |
| 8 parts of Ex. 16 2 parts of Ex. 17 | 1.5 | 80-57-48-37-15-12 | 23 | 34 | 50-38-33-25-8-6 | 12 | 26 |
| Biovis ® | 1.0 | 17-13-12-9-5-4 | 4 | 9 | 10-6-4-3-1-1 | 4 | 2 |
| | 1.5 | 23-18-15-12-7-6 | 5 | 13 | 21-14-12-9-4-4 | 8 | 6 |
| Xanthan | 1.0 | 16-12-10-8-4-4 | 4 | 8 | 4-2-1-0-0-0 | 2 | 0 |
| | 1.5 | 23-18-16-13-7-6 | 5 | 13 | 4-3-1-0-0-0 | 1 | 2 |

The inventive polymers have a higher viscosity at the same dosage compared to Biovis ® (Scleroglucan, from BASF) and particularly compared to Xanthan (Bioflow ®, from BASF), especially after ageing. It is also of interest that flatter rheology can be achieved with a mixture of the two inventive polymers.

6. Use in Completion Fluids

6.1 Use Example 10

The inventive polymer from preparation example 16 was tested in 4 different high-density salt solutions ("brines") which are used as solids-free completion fluids:

Brine 1:
56% by weight of tap water
24% by weight of CaBr$_2$
20% by weight of CaCl$_2$
Density: 1.456 g/ml Brine 2:
40.2% by weight of tap water
59.8% by weight of CaBr$_2$
Density: 1.774 g/ml Brine 3:
58% by weight of tap water
42% by weight of CaCl$_2$
Density: 1.351 g/ml Brine 4:
59.4% by weight of tap water
40.6% by weight of sodium formate
Density: 1.257 g/ml The inventive polymers were added as a 1.75% solution to the particular brines, and the viscosity of the resulting completion fluid was determined with the Fann-35 at room temperature. The completion fluids were aged dynamically in a roller kiln at the particular temperatures specified for 16 hours. Subsequently, the liquid was cooled to RT and determined again with the Fann-35.

To prepare the 1.75% polymer solution (1.75 g of polymer+98.25 g of water), water was initially charged in an HBM container on an IKA stirrer, the polymer was added and the mixture was stirred at 1100 rpm for 1 h. To prepare the completion solutions, 200 g of a 1.75% polymer solution and 200 g of brine were weighed into an HBM container and stirred at 1100 rpm for 30 min. The density was determined and the rheology was measured. The mixture was left to age in the roller kiln at the particular temperature for 16 h, and then the ageing cell was cooled in a water bath. The mixture was stirred briefly with a spatula and the rheology was measured again at room temperature. The results are shown FIG. 6 (sodium formate brine with a density of 1.11 g/ml), FIG. 7 (CaCl$_2$/CaBr$_2$ brine with a density of 1.19 g/ml) and FIG. 8 (CaBr$_2$ brine with a density of 1.16 g/ml). These graphical representations show clearly that the inventive copolymer can be used as a thickening rheological additive for completion fluids.

The invention claimed is:

1. A method of developing, exploiting and completing underground mineral oil and natural gas deposits and in deep drillings comprising inserting into a gas or oil well an aqueous composition comprising a hydrophobically associating copolymer, wherein the copolymer comprises (a) at least one monoethylenically unsaturated monomer (a) of the general formula (I)

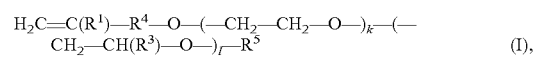

wherein the —(—CH$_2$—CH$_2$—O—)$_k$— and —(—CH$_2$—CH(R$^3$)—O—)$_l$— units are arranged in block structure in the sequence shown in formula (I) and wherein:

k is a number from 6 to 150,
l is a number from 5 to 25,
$R^1$ is H or methyl,
$R^3$ is each independently a hydrocarbyl radical having at least 2 carbon atoms,
$R^4$ is a single bond or divalent linking group O—$(C_{n'}H_{2'})$—, where n' is an integer from 1 to 6,
$R^5$ is H or $C_{1-5}$-alkyl radical,
and (b) at least one monoethylenically unsaturated, hydrophilic monomer (b) different from monomer (a),
wherein the copolymer is obtained by copolymerization of the monomers (a) and (b) in the presence of at least one surfactant (c),
wherein the at least one monomer (b) comprises at least one monomer comprising acidic groups or salts thereof,
wherein the at least one surfactant (c) comprises at least one nonionic surfactant.

2. The method according to claim 1, wherein the synthesis of the copolymer, before the initiation of the polymerization reaction, involved the presence of the at least one nonpolymerizable surfactant (c).

3. The method of claim 1, wherein the copolymer is present as a thickening rheological additive for hydraulic fracturing.

4. The method of claim 1, wherein the copolymer is thickening rheological additive and the aqueous composition is a completion fluid.

5. The method of claim 1, wherein the copolymer is as a thickening rheological additive for spacer fluids.

6. The method of claim 1, wherein the copolymer is rheological additive and the composition is a drilling fluid.

7. The method of claim 1, wherein the copolymer is at least one of a thickening rheological additive or a stabilizer and the aqueous composition is a foam.

8. The method of claim 1, wherein the temperature is in the range from 40° C. to 120° C.

9. The method of claim 1, wherein in the synthesis of the copolymer, the monomer (a) is present in an amount of from 0.1 to 20.0% by weight, the monomer (b) in an amount of from 50.0 to 99.8% by weight, and the nonpolymerizable surfactant (c) in amounts of 0.1 to 10.0% by weight, based in each case on the total amount of all components (a), (b) and (c) in the copolymer synthesis.

10. The method of claim 1, wherein $R^3$ is a hydrocarbyl radical having at least 3 carbon atoms.

11. The method of claim 1, wherein $R^1$ is H and $R^4$ is a group selected from the group consisting of —$CH_2$— and —O—$CH_2$—$CH_2$—$CH_2$—$CH_2$—.

12. The method of claim 1, wherein the acidic groups are at least one group selected from the group consisting of —COOH, —$SO_3H$ and —$PO_3H_2$, and salts thereof.

13. The method of claim 1, wherein the copolymer is a copolymer (A1) which comprises at least two different hydrophilic monomers (b), which comprise at least one uncharged hydrophilic monomer (b1), and
at least one hydrophilic anionic monomer (b2) which comprises at least one acidic group selected from the group consisting of —COOH, —$SO_3H$ and —$PO_3H_2$, and salts thereof,
wherein the amount of the monomers (a) is 0.1 to 20% by weight and that of all monomers (b) together is 70 to 99.5% by weight, based on the amount of all monomers in the copolymer.

14. The method of claim 13, wherein the uncharged monomer (b1) is a monomer selected from the group consisting of (meth)acrylamide, N-methyl(meth)-acrylamide, N,N-dimethyl(meth)acrylamide, N-methylol(meth)acrylamide, N-vinylformamide and N-vinyl-2-pyrrolidone, and the monomer (b2) is at least one monomer selected from the group of (meth)acrylic acid, vinylsulphonic acid, allylsulphonic acid, 2-acrylamido-2-methylpropanesulphonic acid, 2-methacrylamido-2-methylpropanesulphonic acid, 2-acrylamidobutanesulphonic acid, 3-acrylamido-3-methylbutanesulphonic acid, 2-acrylamido-2,4,4-trimethylpentanesulphonic acid and vinylphosphonic acid.

15. The method of claim 1, wherein the copolymer is a copolymer (A2) which comprises at least two different hydrophilic monomers (b), which are at least
one uncharged hydrophilic monomer (b1), and
at least one cationic monomer (b3),
where the amount of the monomers (a) is 0.1 to 20% by weight and that of all monomers (b) together is 70 to 99.9% by weight, based on the amount of all monomers in the copolymer.

16. The method of claim 1, wherein the copolymer is a copolymer (A3) which comprises at least two different hydrophilic monomers (b), which are at least 5 to 50% by weight of at least one uncharged hydrophilic monomer (b1), and
25 to 94.9% by weight of at least one anionic monomer (b2) comprising sulpho groups,
where the amount of the monomers (a) is 0.1 to 20% by weight and that of all monomers (b) together is 70 to 99.9% by weight, based on the amount of all monomers in the copolymer.

17. The method of claim 1, wherein the copolymer further comprises up to 1% by weight of a crosslinking monomer (d) comprising at least two ethylenically unsaturated groups, where monomer (d) comprises at least one monomer selected from the group consisting of triallylamine, triallylmethylammonium chloride, tetraallylammonium chloride, N,N'-methylenebisacrylamide, triethylene glycol bismethacrylate, triethylene glycol bisacrylate, polyethylene glycol(400) bismethacrylate and polyethylene glycol(400) bisacrylate.

* * * * *